(12) United States Patent
Chass

(10) Patent No.: US 6,489,694 B1
(45) Date of Patent: Dec. 3, 2002

(54) FERROFLUIDIC, ELECTRICAL POWER GENERATOR

(76) Inventor: Jacob Chass, 70-25 Yellowstone Blvd. Apt. 24D, Forest Hills, NY (US) 11375

( * ) Notice: Subject to any disclaimer, the term of this patent is extended or adjusted under 35 U.S.C. 154(b) by 0 days.

(21) Appl. No.: 10/051,950

(22) Filed: Jan. 22, 2002

(51) Int. Cl.[7] .............................................. H02K 44/00
(52) U.S. Cl. ........................................ 310/11; 310/152
(58) Field of Search .................... 310/11; 33/377; 73/514.08

(56) References Cited

U.S. PATENT DOCUMENTS

| | | | | |
|---|---|---|---|---|
| 428,057 A | * | 5/1890 | Tesla | |
| 3,184,861 A | * | 5/1965 | Conrad | 33/206 |
| 3,516,294 A | * | 6/1970 | Schmieder | 73/514.08 |
| 3,839,904 A | * | 10/1974 | Stripling et al. | 33/366.15 |
| 3,906,415 A | * | 9/1975 | Baker | 200/14 |
| 4,064,409 A | * | 12/1977 | Redman | 165/104.14 |
| 4,220,907 A | * | 9/1980 | Pappas et al. | 310/5 |
| 5,456,013 A | * | 10/1995 | Elias | 33/366.18 |
| 5,632,093 A | * | 5/1997 | Elias | 33/366.25 |
| 5,908,987 A | * | 6/1999 | Raj | 73/514.08 |

* cited by examiner

*Primary Examiner*—Nestor Ramirez
*Assistant Examiner*—Heba Yoursi Mohammed Elkassabgi

(57) ABSTRACT

A ferrofluidic electrical power generator installed within an agitating object, such as the interior of a vehicular tire generates electrical current in an electrical winding wound about an elongated permanent magnet. The winding is surrounded by sealed container made of non-magnetic material, partially filled with magnetized ferrofluid. The permanent magnet and the magnetized ferrofluid form a magnetic circuit surrounded by the electrical winding. Rotation and horizontal velocity of the tire will agitate the magnetized ferrofluid within the sealed container causing cyclic variations in the distribution of the magnetized ferrofluid causing variation in the magnetic flux density, thus, induction in the electrical winding.

12 Claims, 4 Drawing Sheets

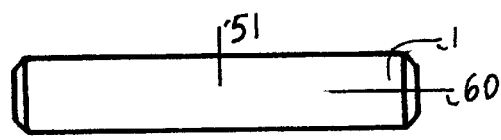
FIG. 3  FIG. 4
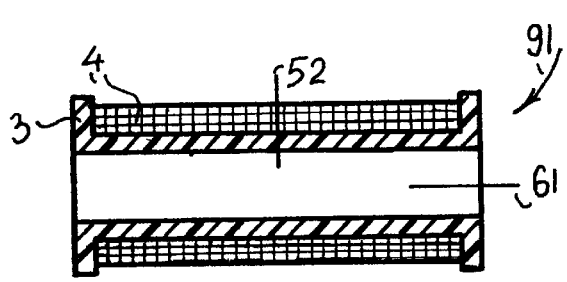
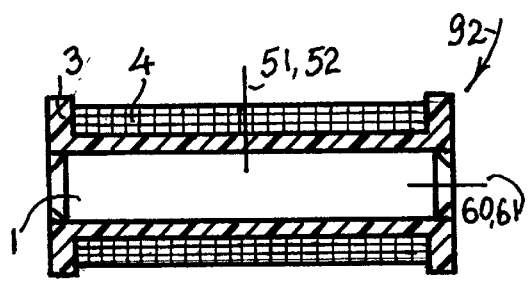
FIG. 5  FIG. 6
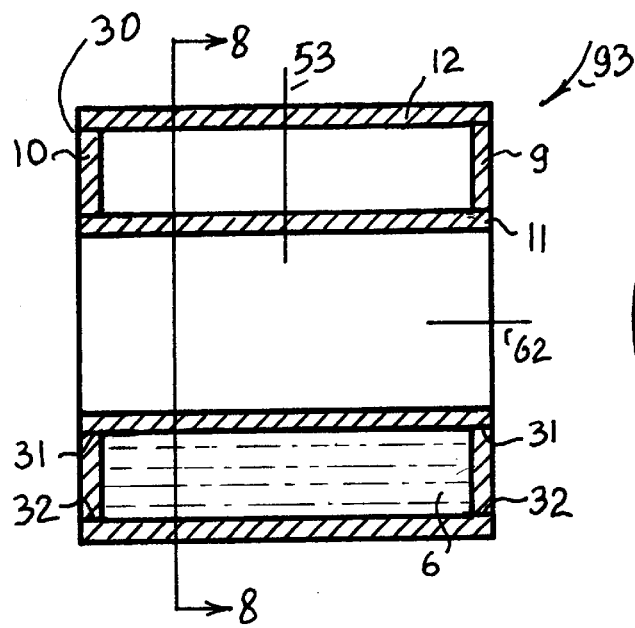
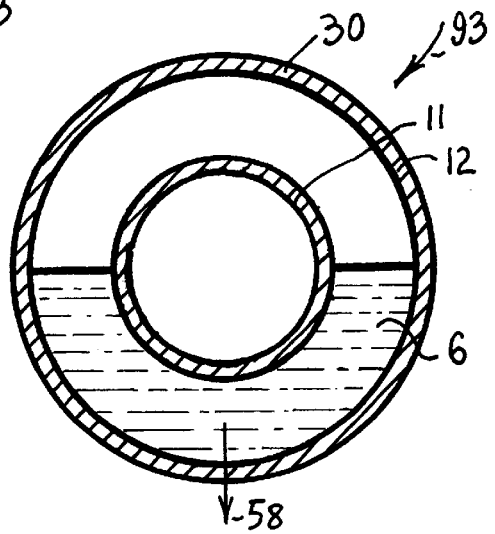
FIG. 7  FIG. 8

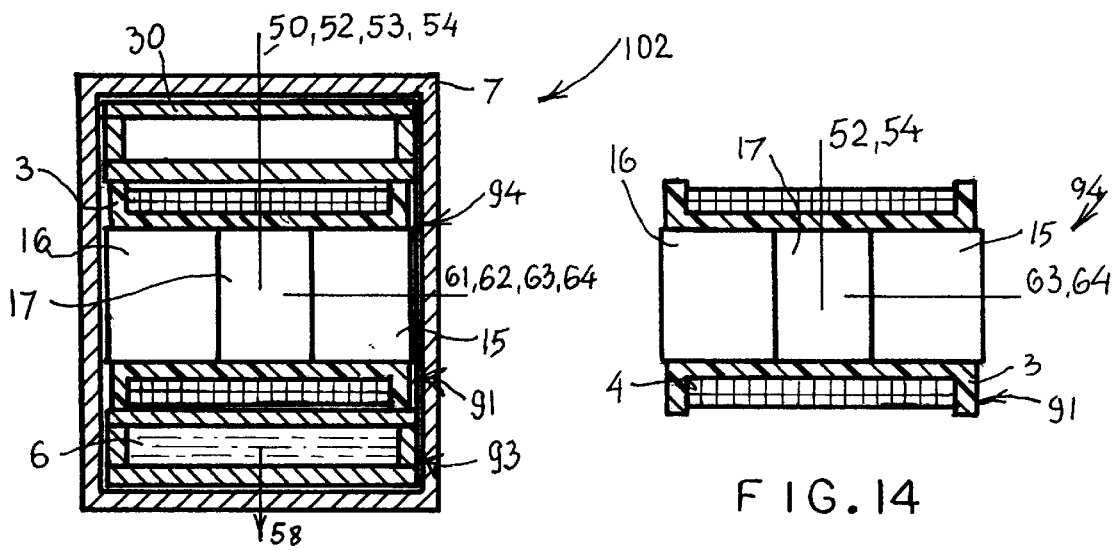
FIG. 9
FIG. 14
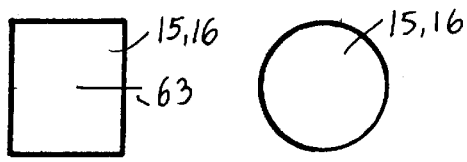
FIG. 10  FIG. 11  FIG. 12  FIG. 13
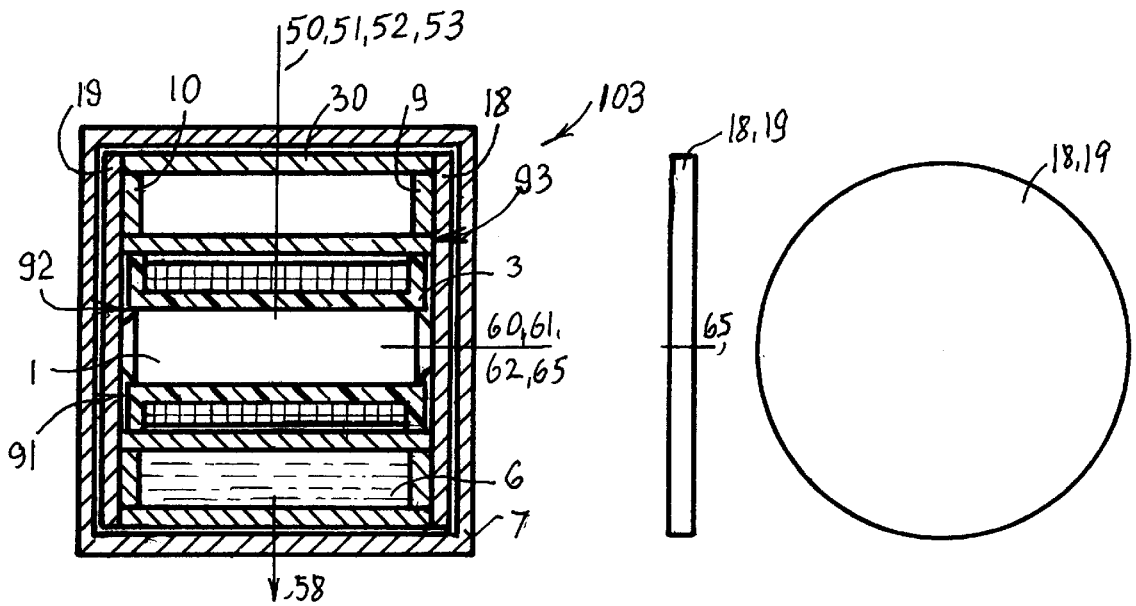
FIG. 15  FIG. 16  FIG. 17

FERROFLUIDIC, ELECTRICAL POWER GENERATOR

CROSS REFERENCES

United States Patents

| | | |
|---|---|---|
| 3,839,904 | 10/1974 | Stripling et al. |
| 4,064,409 | 12/1977 | Redman |
| 4,220,907 | 9/1978 | Pappas et al. |
| 5,632,093 | 5/1997 | Elias |
| 5,908,987 | 6/1999 | Raj; Kuldip |

BACKGROUND OF THE INVENTION

The present invention relates to an electromagnetic power generator and in particular to an electrical power generator intended for installation within a vehicular tire. Such electrical power generator can supply electrical power to energize a pressure sensor and a high frequency radio transmitter for monitoring tire air-pressure while traveling. Incorrect low tire pressure may cause, while traveling, tire rupture and an accident. Such system is described in U.S. Pat. No. 4,220,907, electromagnetic power generator, by Dennis G. Pappas et al. A change in the mechanical form of a vehicular tire, while traveling, is utilized for opening and closing a magnetic circuit thus generating electrical power. Another system for generating electrical power utilizing ferrofluid is described in U.S. Pat. No. 4,064,409, by Charles M. Redman. Thermal energy is converted into electrical power using flow of magnetized ferrofluid through a coil. An additional system utilizing ferrofluid and a permanent magnet is described in U.S. Pat. 5,632,093 by Sharon A. Elias, where mechanical vibrations are converted into an electrical voltage.

SUMMARY OF THE INVENTION

The ferrofluidic, electrical power generators constructed in accordance with the principles of the present invention consists of: an elongated, axially polarized permanent magnet; an electrical coil wound of insulated, electrically conductive wire disposed about a portion of said permanent magnet, and a double wall, cylindrical, sealed hollow hub housing made of non-magnetic material partially filled with ferrofluid. The assemblage of the permanent magnet and coil is firmly attached within said housing forming a magnetic circuit encompassed by said coil. Axial agitation of the magnetized ferrofluid will generate cyclic variations in the magnetic flux density causing induction in the electrical coil, generating electrical power.

Said electromagnetic power generator may be firmly attached to the outer steel rim of a vehicular tire. Rotation and horizontal velocity of said tire will cause agitation of the magnetized ferrofluid within the sealed housing and therefore, induction in the electrical coil.

In view of the above it is the principal object of the present invention to provide an electromagnetic power generator to power a pressure sensor and radio transmitter for the purpose of monitoring air pressure within the tire while the vehicle is in motion.

A further object is to provide such a device which may be small in size reliable, with no movable solid mechanical components. Such device generates electric power when firmly attached to an agitating object. A still further object is to provide such a device, which is simple in design and easy to manufacture. The above objects and advantages are attained with the present invention by providing five embodiments of a ferrofluidic, electrical power generator.

BRIEF DESCRIPTION OF THE DRAWINGS

FIG. 3 is a side view of an axially polarized permanent magnet utilized in the first, third and fifth embodiments of the invention.

FIG. 4 is a front and back view of the permanent magnet of FIG. 3.

FIG. 5 is a schematic diagram, side view section of the bobbin-winding assembly.

FIG. 6 is a side view partial section of the assemblage of permanent magnet of FIG. 3 and bobbin-winding assembly of FIG. 5.

FIG. 7 is a schematic diagram, side view section of a hollow hub, double wall sealed container partially filled with ferrofluid, which is cylindrical in shape and made of non-magnetic material.

FIG. 8 is a schematic diagram, front view section along the line 8—8 of FIG. 7 in the direction of the arrows.

FIG. 9 is a schematic diagram, side view partial section of the second embodiment of the invention.

FIG. 10 is a side view of a permanent magnet axially polarized utilized in the ninth embodiment of the invention.

FIG. 11 illustrates side view of a cylindrical rod section made of magnetic material.

FIG. 12 illustrates front and back view of the permanent magnet of FIG. 10.

FIG. 13 illustrates front and back view of the rod section of FIG. 12.

FIG. 14 is a schematic diagram, side view partial section of the assemblage of the bobbin-winding assembly of FIG. 5, permanent magnet of FIG. 12 and two cylindrical magnetic rod sections of FIG. 11.

FIG. 15 is a schematic diagram, side view partial section of the third embodiment of the invention.

FIG. 16 illustrates side view of a disk utilized in the third and fourth embodiment of the invention. Said disk is made of magnetic material.

FIG. 17 illustrates front and back view of the disk of FIG. 16.

DETAILED DESCRIPTION OF THE DRAWINGS

Figure 1:
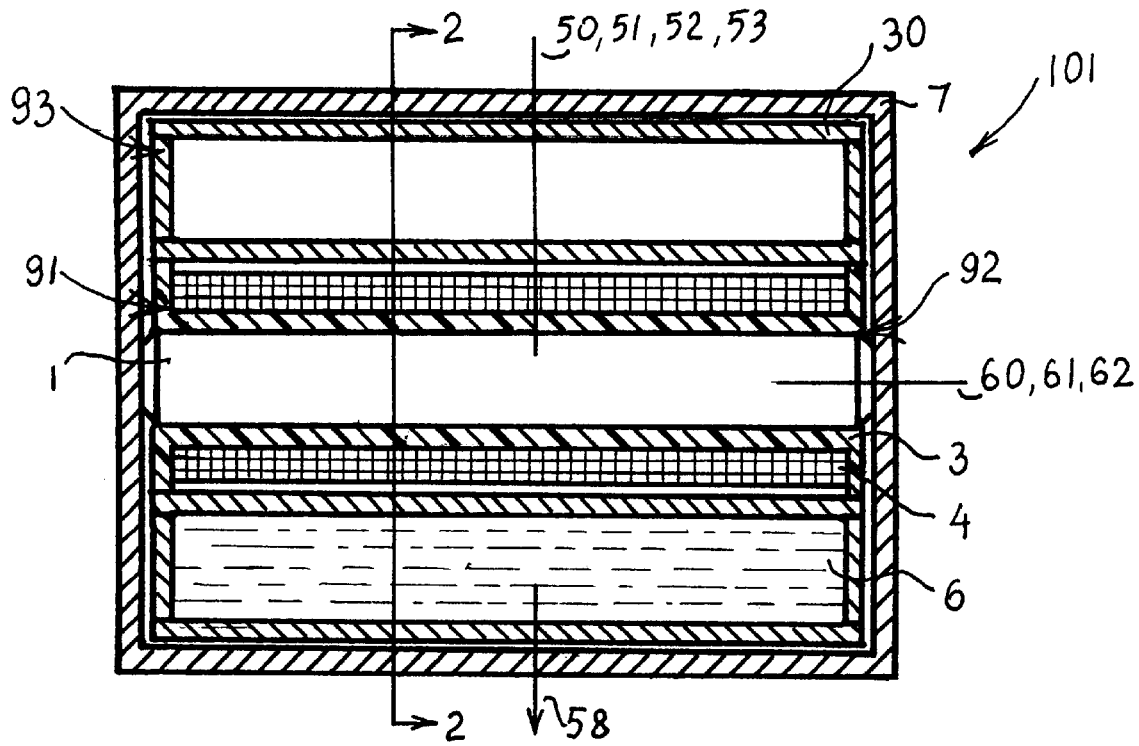
FIG. 1 is a schematic diagram, side view partial section, of the first embodiment of the invention.
Figure 2:
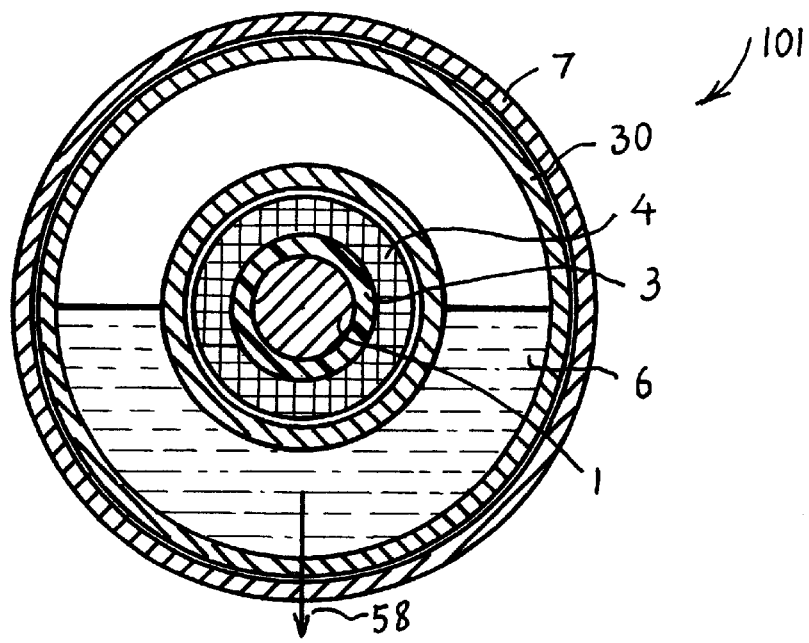
FIG. 2 is a front view section, along the line 2—2 of FIG. 1 in the direction of the arrows.

Reference is now made to the drawings and to FIG. 1 in particular wherein the first embodiment of ferrofluidic, electrical power generator in accordance with the present invention is depicted. The electrical power generator 101 comprising assemblage 92 (FIG. 6), container assembly 93 (FIG.7) and housing 7. Housing 7 is made of non-magnetic material. Assemblage 92 comprising permanent magnet 1 (FIG. 3) axially polarized, and bobbin-winding assembly 91 (FIG. 5) comprising a hollow hub bobbin 3, made of non-magnetic material and winding 4, wound about said bobbin. Windings 4 are of insulated, electrically conductive wire.

Also shown: in FIG. 3, axis 60 and line of lateral symmetry 51, in FIG. 5, axis 61 and line of lateral symmetry 52. Axial length of bobbin 3 and axial length of permanent magnet 1 are substantially the same. Permanent magnet 1 is firmly attached within hollow hub of bobbin 3. Line 51 and line 52 substantially coincide, axis 60 and axis 61 substantially coincide (FIG. 6). Assemblage 93 (FIG. 7), consists of a sealed container 30 partially filled with ferrofluid 6. Container 30 is formed by the assembly of two concentric shells, substantially equal in axial length and of different diameters, and two substantially identical washers. Said shells and washers are made of non-magnetic material. Shown is axis 62, of shells 11 and 12, washers 9 and 10. Also shown is line of lateral symmetry 53. Washer 9 is firmly attached to one end of shells 11 and 12 and washer 10 is firmly attached to the other end of shells 11 and 12, forming container 30. Also shown, diameter 31 (FIG. 7) which is inside diameter of washers 9 and 10, and outside diameter of shell 11. Also shown, diameter 32 which is outside diameter of washers 9 and 10, and inside diameter of shell 12.

Container 30 is partially filled with ferrofluid, and is hermetically sealed forming assemblage 93. FIG. 8 is a front view section of container 30, showing direction of the force of gravity, 58. Assemblage 92 (FIG. 6) is firmly attached within shell 11 of assemblage 93 (FIG. 7) forming magnet-winding assemblage, FIG. 1 line 52 and line 53 substantially coincide.

The assembly of 92 (FIG. 6) and 93 (FIG. 7) is firmly attached within housing 7. Line 50, lateral line of symmetry of housing 7 substantially coincide with lines 51, 52, and 53, forming ferrofluidic electrical power generator.

The permanent magnet 1 and magnetized ferrofuid 6 form a magnetic circuit enclosed by coil 4. Agitation of generator 101 will cause cyclic changes in the distribution of the magnetized ferrofluid in container 30, resulting in cyclic changes in the magnetic flux flow, causing induction in coil 3.

Reference is now made to FIG. 9 wherein a ferrofluidic, electrical power generator in accordance with the second embodiment of the present invention is depicted. Generator 102 is a modified generator 101. Assemblage 92 of generator 101 is replaced by assemblage 94 (FIG. 14) of generator 102. Assemblage 92 is transformed into assemblage 94 by replacing permanent magnet 1 (FIG. 3) by permanent magnet 17 (FIG. 12), axially polarized, and two substantial identical cylindrical rod sections 15, 16, made of magnetic material (FIG. 10, FIG. 11). Total axial length of parts 15, 16 and 17 is substantial equal to the axial length of permanent magnet 1, of generator 101. Also shown in FIG. 14: axis 63 of magnetic rod sections, axis 64 of permanent magnet 17 and line of lateral symmetry 54 (FIG. 12). Assembly procedure of 94 (FIG. 14) is similar to the assembly procedure of 92 (FIG. 6). Parts 15, 16 and 17 are firmly attached within bobbin 3, line 54 and line 52 coincide.

Referring to FIG. 9, generator 102. Line 50, line of lateral symmetry substantially coincides with lines 52, 53 and 54.

Axes 61, 62, 63 and 64 substantially coincide. Operation of generator 102 is very similar to the operation of generator 101.

Reference is now made to FIG. 15 wherein a ferrofluidic, electrical power generator in accordance with the third embodiment of the present invention is depicted. Generator 103 is a modified generator 101. Two flat disks 18, 19 (FIG. 16) made of magnetic material firmly attached to washer 9 and washer 10 of assembly 93 (FIG. 7). Outside diameters of washers 9 and 10 and diameters of disks 18 and 19 are substantially identical. Axis 65 of disks 18, 19 and axis 62 of washers 9, 10 substantially coincide.

The addition of magnetic disks 18, 19 will enhance the magnetic coupling between the permanent magnet 1 (FIG. 3) and ferrofluid 6 in container 30 (FIG. 7).

Operation of generator 103 is the same as operation of generator 101.

Figure 18:
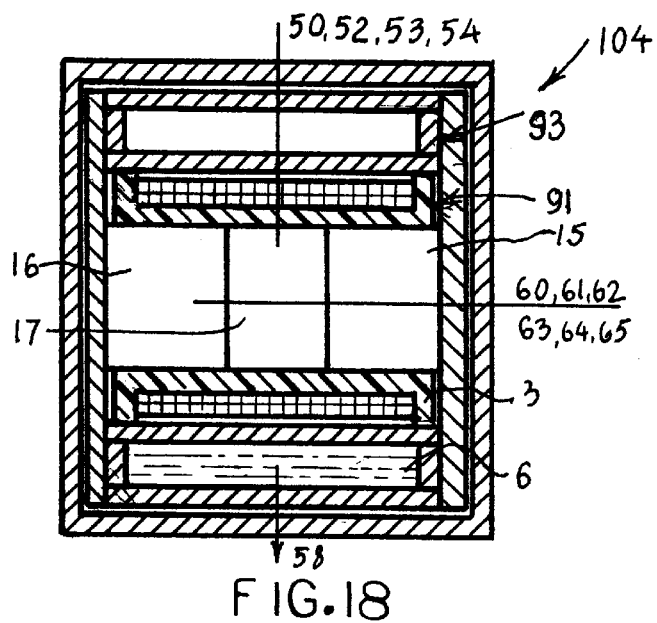
FIG. 18 is a schematic diagram, side view section of the fourth embodiment of the invention.

Reference is now made to FIG. 18 wherein a ferrofluidic, electrical power generator in accordance with the fourth embodiment of the present invention is depicted. The generator 104 FIG. 18 is a modified generator 103 FIG. 15. Permanent magnet 1 (FIG. 15) is replaced by parts 15, 16 and 17 (FIG. 10, FIG. 12), as illustrated in FIG. 9. Assembly and performance of generator 104 are similar to those of generators 102, 103.

Figure 22:
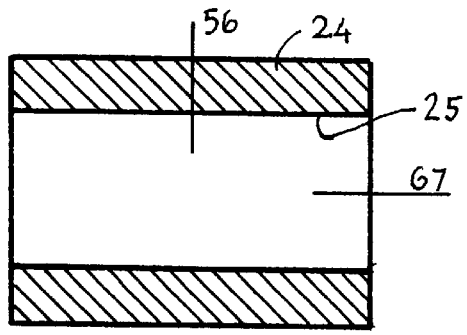
FIG. 22 illustrates side view section of a hollow hub permanent magnet, axially polarized, utilized in the fifth embodiment of the invention.
Figure 19:
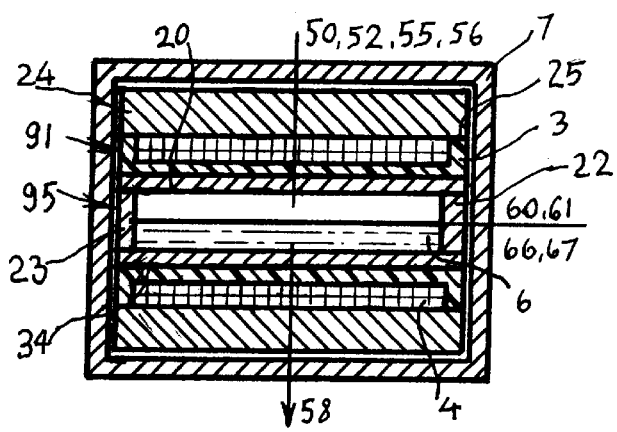
FIG. 19 is a schematic diagram, side view section of the fifth embodiment of the invention.
Figure 23:
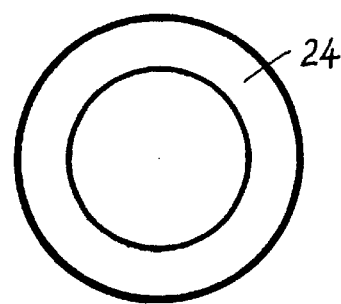
FIG. 23 illustrates front and back view of the permanent magnet of FIG. 22.
Figure 20:
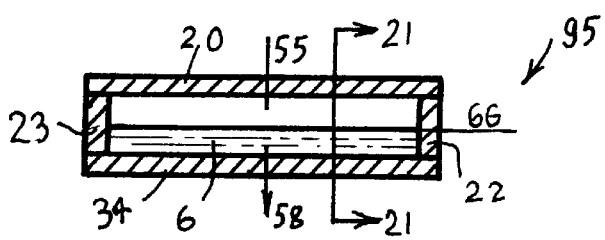
FIG. 20 illustrates side view section of sealed vial, partially filled with ferrofluid.
Figure 21:
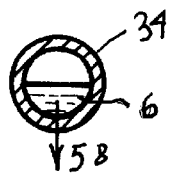
FIG. 21 illustrates front view section, along the line 21—21 of FIG. 20 in the direction of the arrows.

Reference is now made to FIG. 19 wherein a ferrofluidic, electrical power generator in accordance with the fifth embodiment of the present invention is depicted. Generator 105 (FIG. 19) comprises an elongated vessel assembly 95 (FIG. 20), bobbin-winding assembly 91 (FIG. 5), an elongated permanent magnet axially polarized 24 (FIG. 22) and housing 7 made of non-magnetic material. Vial 34 (FIG. 20) comprises a shell 20, disk 22 and disk 23. disk 22 is firmly attached to one end of shell 20 and disk 23 is firmly attached to the other end of shell 20 forming an hermetically sealed vial 34. Vial 34 is partially filled with ferrofluid 6 forming vessel 95. Also shown axis 66 and line of lateral symmetry 55 of vessel 95. said vial may have various shapes and configurations, depending on material and manufacturing costs. Bobbin-winding assembly 91 (FIG. 5) was already described, (generator 101).

Axial length of bobbin 3 (FIG. 5) and axial length of vessel 95 (FIG. 20) are substantial the same. Inside diameter of bobbin 3 and outside diameter of shell 20 are substantially the same. Vessel 95 is firmly attached within hollow hub of bobbin 3. Axis 61 and axis 66 substantially coincide. Lines of lateral symmetry 52 and 55 substantially coincide.

Permanent magnet 24 (FIG. 22) is hollow hub cylindrical bar axially polarized having axis 67, inside diameter 25, line of lateral symmetry 56 and axial length substantially equal to the length of bobbin 3.

Assemblage 95 and 91 are firmly attached within permanent magnet 24. Axes 61, 66 and 67 substantially coincide. Lines of lateral symmetry 52, 55 and 56 substantially coincide. Assemblage of vessel 95, bobbin-winding assembly 91 and permanent magnet 24 are firmly attached within housing 7. Axes 61, 66, and 67 substantially coincide. Lines of lateral symmetry 50, 52, 55 and 56 substantially coincide forming ferrofluidic, electrical power generator. Ferrofluid 6 (FIG. 20) and permanent magnet 24 form a magnetic circuit encircled by winding 4 (FIG. 19). Operation of generator 105 is the same as operation of generator 101.

Although the inventions have been described with specific reference to five embodiments, it will be apparent to a knowledgeable person, upon reading this patent, that numerous and alternative materials and arrangements may be devised by those skilled in the art without departing from the spirit and scope of the inventions as defined by the appended claims.

What is claimed is:

1. An electrical power generator comprising:

an elongated permanent magnet axially polarized;

an elongated bobbin of non-magnetic material, said bobbin having a hollow hub extending its entire axial length, electrical winding having at least one coil wound of insulated, electrically conductive wire disposed about said bobbin producing at least one bobbin winding assembly such that said bobbin winding assembly has the ability to produce electric power upon enclosing a variable magnetic flux flow;

an elongated container, said container consisting, generally, of two non-magnetic concentric shells of different diameters and equal axial lengths, and two washers of non-magnetic material; said washers are firmly attached to the ends of said concentric shells, forming a hollow hub, double wall closed container; said container is partially filled with ferrofluid that has the ability to conduct magnetic flux; axial lengths of said container, said bobbin and said permanent magnet are generally the same;

said permanent magnet is deposited and firmly attached within hollow hub of said bobbin, forming magnet-winding assemblage; axes of permanent magnet and bobbin winding assembly substantially coincide; lines of lateral symmetry of said permanent magnet and said bobbin winding assembly substantially coincide;

said magnet-winding assemblage is deposited and firmly attached within hollow hub of said container, forming a magnetic circuit of said permanent magnet and said magnetized ferrofluid, enclosed by said winding; variation in the distribution of said magnetized ferrofluid within said container, due to mechanical agitation, will cause variations in said magnetic magnetic circuit, causing induction in said winding, producing electrical power; axes of said permanent magnet and said container substantially coincide; lateral lines of symmetry of said permanent magnet and said container substantially coincide.

2. The invention in accordance with claim 1 wherein said container is hermetically sealed.

3. The invention in accordance with claim 1 wherein said permanent magnet is a radial section of a solid cylinder.

4. The invention in accordance with claim 3 wherein two flat disks made of magnetic material are firmly attached to each end of said permanent magnet; axes of said magnetic disks and permanent magnet substantially coincide; diameter of said magnetic disks is substantially the same as the external diameter of said container.

5. The invention in accordance with claim 4 wherein said container is hermetically sealed.

6. An electrical power generator comprising:

an elongated permanent magnet axially polarized;

two radial sections of a cylindrical solid rod made of magnetic material;

an elongated bobbin of non-magnetic material, said bobbin having a hollow hub extending its entire axial length; electrical winding having at least one coil wound of insulated, electrically conductive wire disposed about said bobbin producing at least one bobbin winding assembly such that said bobbin winding assembly has the ability to produce electrical power upon enclosing a variable magnetic flux flow;

an elongated container, said container consisting, in general, of two non-magnetic concentric shells of different diameters and equal axial lengths, and two washers of non-magnetic material; said washers are firmly attached to the ends of said concentric shells, forming a hollow hub, double wall, closed container; said container is partially filled with ferrofluid that has the ability to conduct magnetic flux; axial length of said container, said bobbin and total axial lengths of said permanent magnet and said two magnetic rod sections are generally the same;

said permanent magnet is deposited and firmly attached within hollow hub of said bobbin; axes of said permanent magnet and said bobbin substantially coincide; lines of lateral symmetry of said permanent magnet and bobbin substantially coincide; each of said two magnetic rod sections are firmly attached to each end of said permanent magnet, within hollow hub of said bobbin, forming magnet-winding assemblage; axes of said magnetic rod sections and said bobbin substantially coincide;

said magnet-winding assemblage is deposited and firmly attached within hollow hub of said container, forming a magnetic circuit of said permanent magnet, said magnetic rod sections and said magnetized ferrofluid, enclosed by said winding; variation in the distribution of said magnetized ferrofluid within said container will cause variations in said magnetic circuit causing induction in said winding, producing electrical power; axes of said permanent magnet and said container substantially coincide; lateral lines of symmetry of said permanent magnet and said container substantially coincide.

7. The invention in accordance with claim 6 wherein said container is hermetically sealed.

8. The invention in accordance with claim 6 wherein said permanent magnet is a radial section of a solid cylinder.

9. The invention in accordance with claim 8 wherein two flat disks made of magnetic material are firmly attached to each of said magnetic rod ends; axes of said magnetic disks and said magnetic rod sections substantially coincide; diameter of said magnetic disks is substantially the same as the external diameter of said container.

10. The invention in accordance with claim 9 wherein said container is hermetically sealed.

11. An electrical power generator comprising:

an elongated vessel, said vessel comprising an elongated vial partially filled with ferrofluid that has the ability to conduct magnetic flux; said vessel consisting, generally, of a non-magnetic cylindrical shell and two disks of non-magnetic material; said disks are firmly attached to the ends of said non-magnetic shell, forming a closed vial;

an elongated bobbin of non-magnetic material, said bobbin having a hollow hub extending its entire axial length; electrical winding having at least one coil wound of insulated, electrically conductive wire disposed about said bobbin producing at least one bobbin winding assembly such that said bobbin winding assembly has the ability to produce electrical power upon enclosing a variable magnetic flux flow;

an elongated permanent magnet axially polarized, said permanent magnet is generally cylindrical in shape, having a circular hollow hub extending its entire axial length; axial lengths of said permanent magnet, said vessel and said bobbin are generally the same;

said vessel is deposited and firmly attached within hollow hub of said bobbin forming: a low magnetic reluctance path within said bobbin, and a vessel-bobbin assemblage; axes of said vessel and said bobbin substantially coincide; lines of lateral symmetry of said vessel and said bobbin substantially coincide;

said vessel-bobbin assemblage is deposited and firmly attached within the hollow hub of said permanent magnet, forming a magnetic circuit of said permanent magnet and said magnetized ferrofluid, enclosed by said winding; variation in the distribution of said magnetized ferrofluid within said vial, due to mechanical agitation, will cause variation in said magnetic circuit causing induction in said winding, producing electrical power; axes of said permanent magnet and said vial substantially coincide; lateral lines of symmetry of said permanent magnet and said vial substantially coincide.

12. The invention in accordance with claim 11 wherein said vial is hermetically sealed.

* * * * *